United States Patent
Xia et al.

(10) Patent No.: US 9,191,110 B2
(45) Date of Patent: Nov. 17, 2015

(54) REDUCING COHERENT NOISE IN SINGLE FIBER TRANSCEIVERS

(75) Inventors: Tiejun J. Xia, Richardson, TX (US); Glenn A. Wellbrock, Wylie, TX (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 762 days.

(21) Appl. No.: 13/493,018

(22) Filed: Jun. 11, 2012

(65) Prior Publication Data
US 2013/0330072 A1     Dec. 12, 2013

(51) Int. Cl.
*H04B 10/2537* (2013.01)
*H04B 10/40* (2013.01)

(52) U.S. Cl.
CPC ............ *H04B 10/2537* (2013.01); *H04B 10/40* (2013.01)

(58) Field of Classification Search
CPC ...................... H04B 10/07957; H04B 10/2503; H04B 10/2504; H04B 10/2517; H04B 10/40; H04B 10/572; H04J 14/0201–14/0205; H04J 14/021; H04J 14/0213; H04J 14/0224
See application file for complete search history.

(56) References Cited

U.S. PATENT DOCUMENTS

| | | | | |
|---|---|---|---|---|
| 4,551,829 A * | 11/1985 | Dragoo et al. | .................. | 398/82 |
| 6,658,210 B1 * | 12/2003 | Fee | ................................. | 398/79 |
| 7,082,266 B1 * | 7/2006 | Shin | ............................... | 398/79 |
| 8,014,672 B2 * | 9/2011 | Suzuki et al. | .................. | 398/69 |
| 2007/0297468 A1 * | 12/2007 | Stewart et al. | .................. | 372/33 |
| 2011/0229129 A1 * | 9/2011 | Hu et al. | ........................ | 398/34 |

* cited by examiner

*Primary Examiner* — Danny Leung
*Assistant Examiner* — Casey Kretzer

(57) ABSTRACT

A method includes monitoring, by a transceiver, a first wavelength corresponding to a transmitted optical signal. The method includes monitoring a second wavelength corresponding to a received optical signal. The method also includes determining whether the first wavelength is identifiably different than the second wavelength. The method includes maintaining a separation between the first and second wavelengths if the first and second wavelengths are identifiably different. The first and second wavelengths are separated if the first and second wavelengths are not identifiably different. The method further includes maintaining the separation between the first and second wavelengths following separation of the first and second wavelengths.

20 Claims, 11 Drawing Sheets

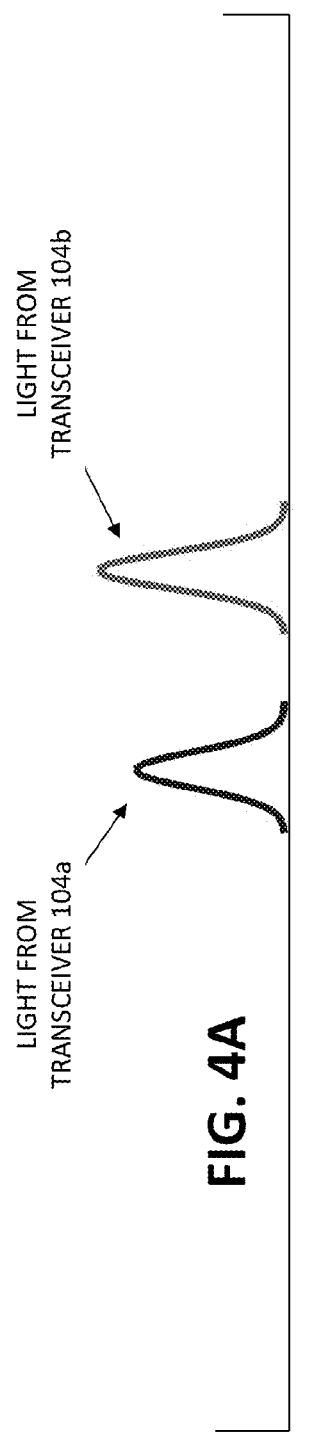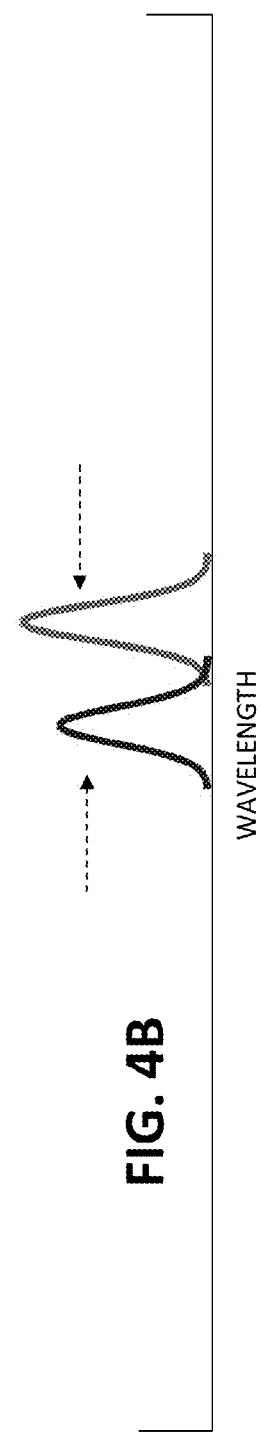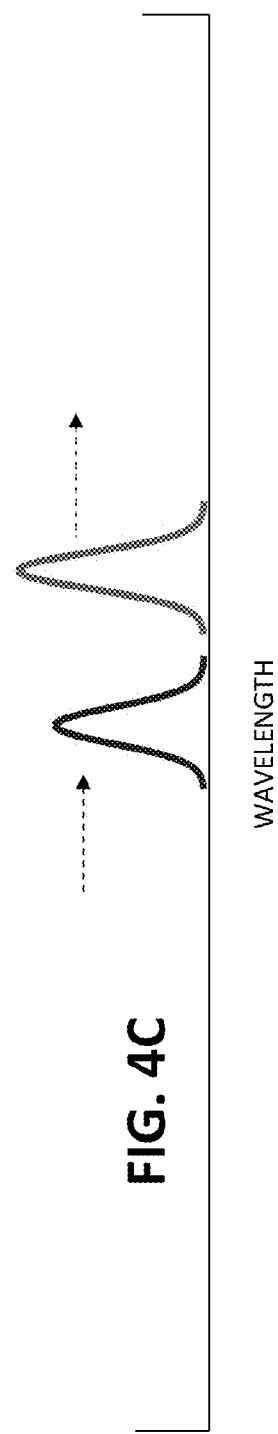

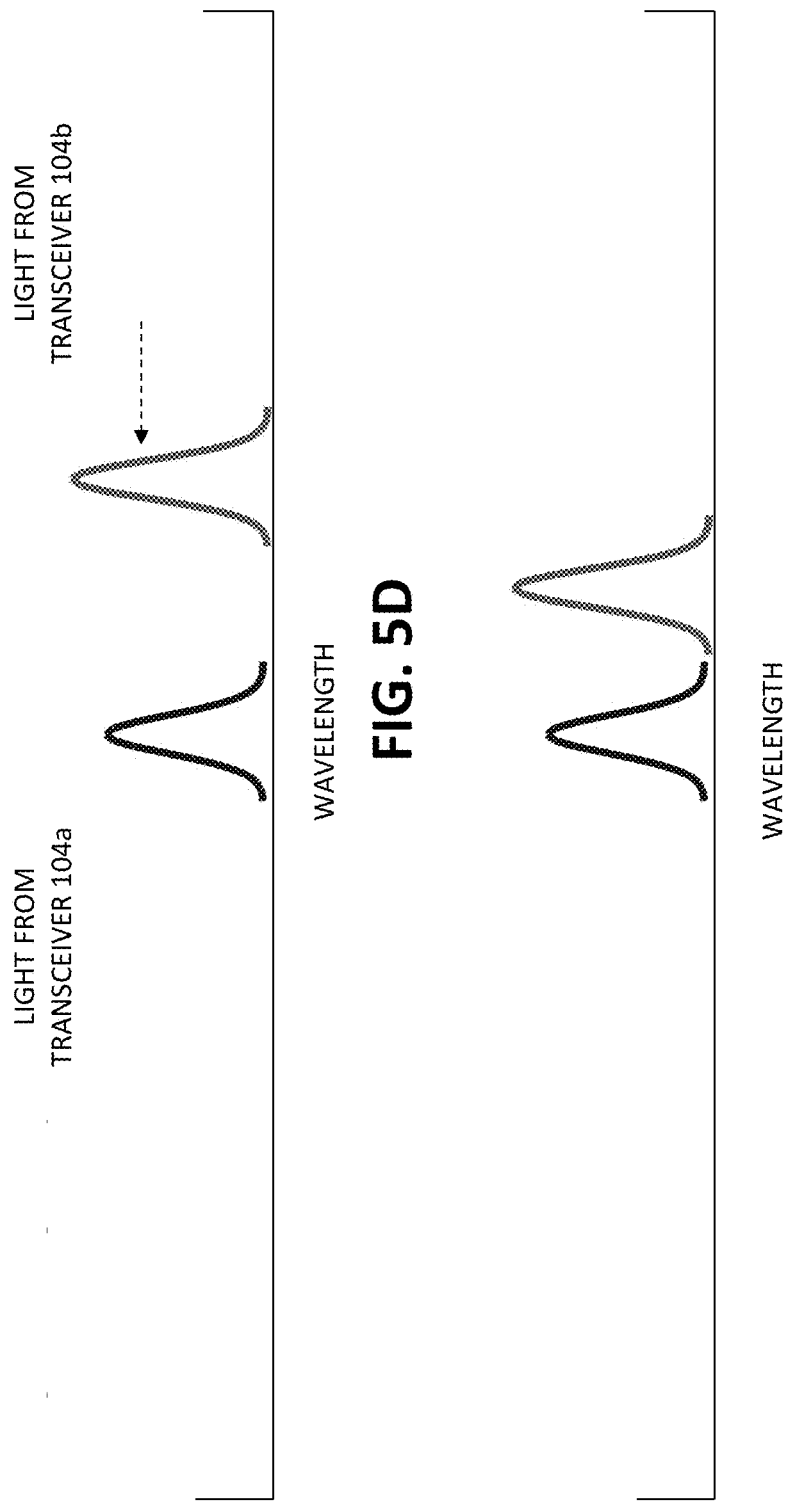

REDUCING COHERENT NOISE IN SINGLE FIBER TRANSCEIVERS

BACKGROUND

Transceivers are devices that both transmit and receive communications. A single fiber transceiver is known to transmit and receive optical signals along an optical axis. Each transmitted optical signal and received optical signal has an associated wavelength.

BRIEF DESCRIPTION OF THE DRAWINGS

FIGS. 4A-4C illustrate an operating scenario based on transmitted and received wavelengths of optical signals;

FIGS. 5A-5E illustrate another operating scenario based on transmitted and received wavelengths of optical signals;

DETAILED DESCRIPTION OF PREFERRED EMBODIMENTS

The following detailed description refers to the accompanying drawings. The same reference numbers in different drawings may identify the same or similar elements. Also, the following detailed description is exemplary and explanatory only and is not restrictive of the invention, as claimed.

Systems and/or methods described herein may reduce coherent noise in single fiber transceivers that use similar wavelengths for a transmitted optical signal and a received optical signal. Consistent with embodiments describe herein, transceivers may be implemented to transmit and receive optical signals that have similar wavelengths while substantially reducing a probability and occurrence of overlap and consequently substantially reducing coherent noise.

Figure 1:
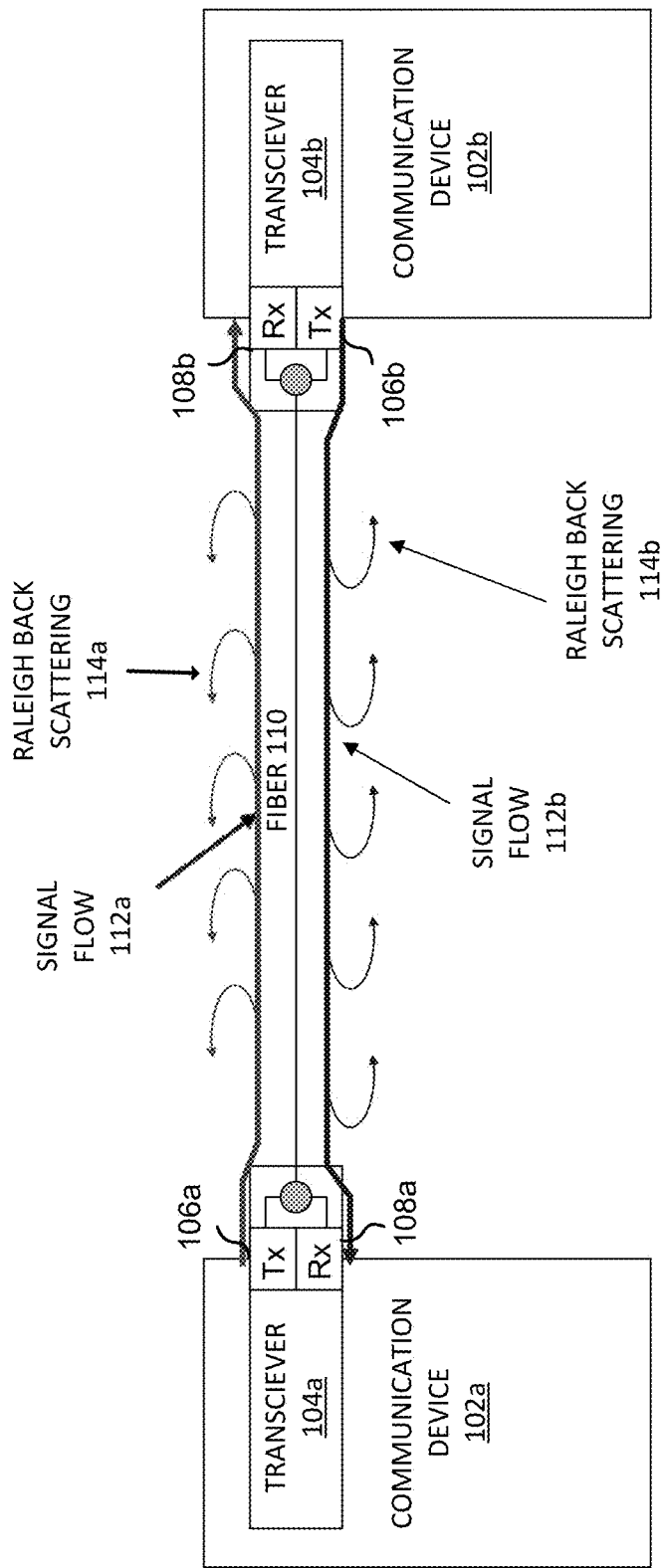
FIG. 1 is an exemplary communication system including single fiber transceivers.

FIG. 1 is a diagram of an exemplary communication system 100. As illustrated, system 100 includes communication devices 102a-102b (collectively referred to as communication devices 102 or individually as communication device 102), which include associated transceivers 104a and 104b (collectively referred to as transceivers 104 or individually as transceiver 104), and communicate using optical signals transmitted and received via a fiber 110. The particular arrangement and number of components of system 100 shown in FIG. 1 are illustrated for simplicity.

Communication device 102 may encode a message, e.g., from an associated information source (not shown), and transmit the encoded message to another communication device 102. For example, communication device 102a may encode an audio signal, a video signal, or other kinds of data for transmission to another communication device 102b. Communication device 102 may provide the message as an electronic signal input for transceiver 104. Transceiver 104 may convert the electronic signal to an optical signal.

Transceiver 104 is a device that may include both a transmitter (Tx) 106 and a receiver (Rx) 108 which may share common (transmitter and receiver handling) circuitry and a single housing. Transceiver 104 may transmit and receive optical signals through fiber 110. For example, Tx 106a, of communication device 102a, may send an optical signal (e.g., signal flow 112a) via fiber 110. The optical signal may be received at Rx 108b of communication device 102b. Transceiver 104 may transmit and receive across fiber 110 in a bidirectional manner (i.e., transmitted optical signals and received signals are propagated in substantially opposite directions). In some instances, the wavelength of the transmitted optical signal and the wavelength of the received optical signal may be substantially similar or the same. In these instances, it may be difficult to differentiate the optical signals, received at a particular transceiver 104, from back scattering in fiber 110 associated with a transmitted optical signal.

When an optical signal travels in fiber 110, the optical signal may include associated back scattering of the optical signal, referred to as Rayleigh back scattering. For example, with respect to communication device 102a, Rayleigh back scattering (e.g. Rayleigh back scattering 114a) from an optical signal traveling in one direction, (e.g., a transmitted optical signal, shown as signal flow 112a) may interfere with the received optical signal (signal flow 112b) traveling in the opposite direction. The Rayleigh back scattering from a transmitted optical signal may interfere with the optical signal and degrade the signal (i.e., introduce coherent noise) if both transmitted and received optical signals have similar wavelengths. Similarly, the Rayleigh back scattering from the received optical signal may affect the transmitted optical signal. If the two wavelengths are close or the same, then coherent noise from degradation of the received signal caused by Rayleigh back scattering may have a large impact on the received optical signal. The degradation from coherent noise increases in instances in which the relative signal levels of the Rayleigh back scattering and the received signal are more closely proportioned to each other. The probability of interference from the coherent noise is proportional to the data rate. For example, for a 10 gigabyte (Gb) per second signal, the probability of signal overlap (i.e., the two wavelengths are the same) may be expressed as:

$$10 \text{ gigahertz (GHz)}/2.5 \text{ terahertz (THz)} = 4 \times 10^{-3}, \quad (1)$$

which is approximately equal to 33 hours in one year, a significant amount of interference from the coherent noise. In other words, if the optical signals are transmitted for a year, the probability of coherent noise caused by Rayleigh back scattering is approximately equal to $4 \times 10^{-3}$ for that year, which is approximately equal to 33 hours.

In implementations described herein, processes and methods may reduce coherent noise in single fiber transceivers that use similar wavelengths for transmitting and receiving optical signals. By monitoring the wavelengths associated with both transceivers, communication system 100 may prevent coherent noise for optical signals with similar wavelengths in single fiber transceivers. The processes and methods may be implemented in transceivers having a small form factor. Additionally, the processes and methods may be implemented in high data rate single fiber transceivers to avoid high probability of coherent noise occurring.

Figure 2:
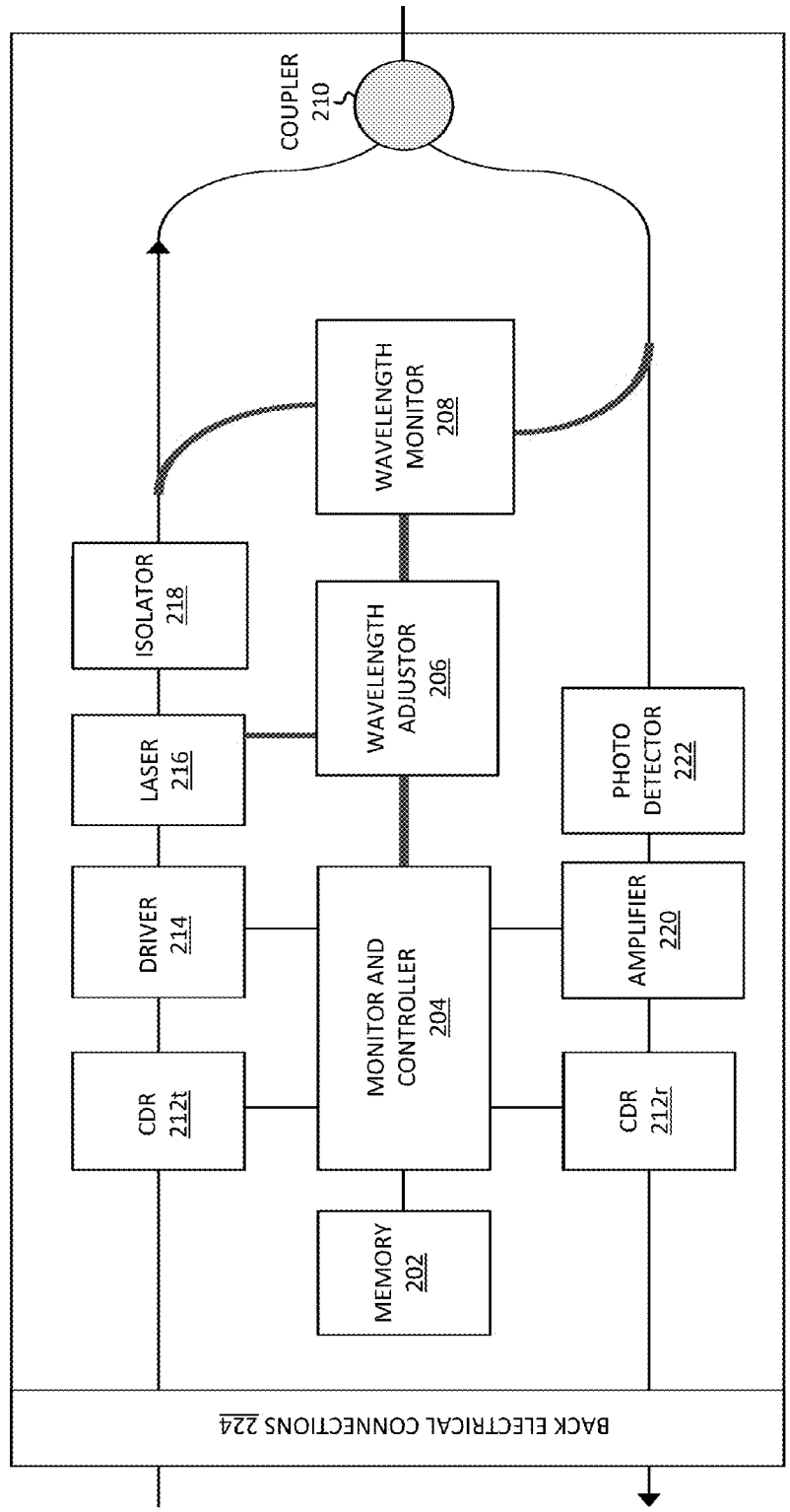
FIG. 2 is a functional block diagram of single fiber transceiver of FIG. 1.

FIG. 2 is a functional block diagram of an exemplary transceiver 104. As shown in FIG. 2, transceiver 104 may include a memory 202, a monitor and controller 204, a wavelength adjustor 206, a wavelength monitor 208, and a coupler 210, two clock and data recoveries (CDRs) 212 (one, CDR 212t, for transmission of an optical signal and the other, CDR 212r, for receiving an optical signal), a driver 214, a laser 216, an isolator 218, an amplifier 220, a photo detector 222, and back electrical connections 224. The particular arrangement and number of components of transceiver 104 shown in FIG. 2 are illustrated for simplicity. In practice there may be more or fewer components and functions described as being performed by a particular component may be performed by other components in transceiver 104.

Figure 7:
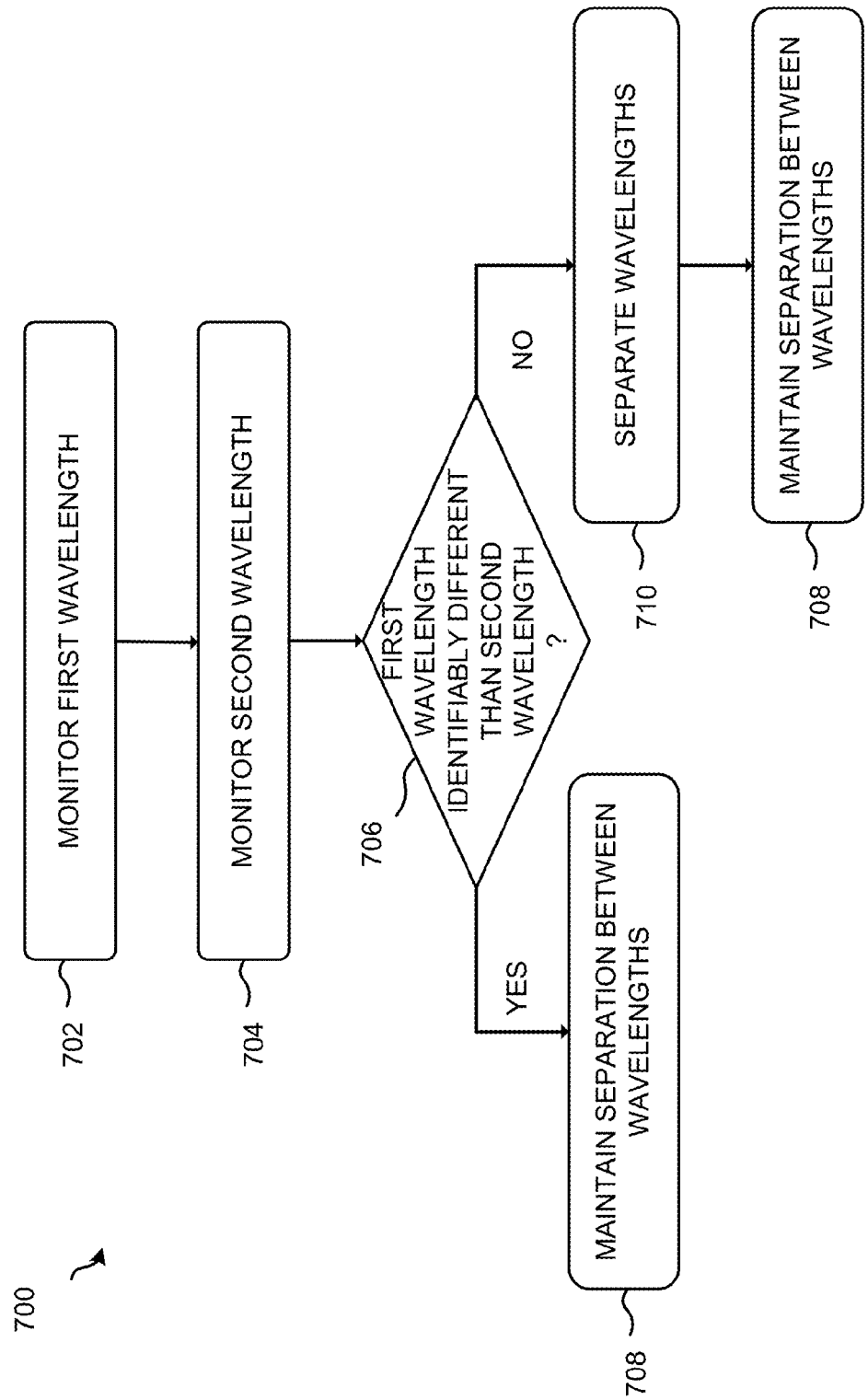
FIG. 7 is a flow chart of an exemplary process for reducing noise in a single fiber transceiver according to an implementation described herein.
Figure 8:
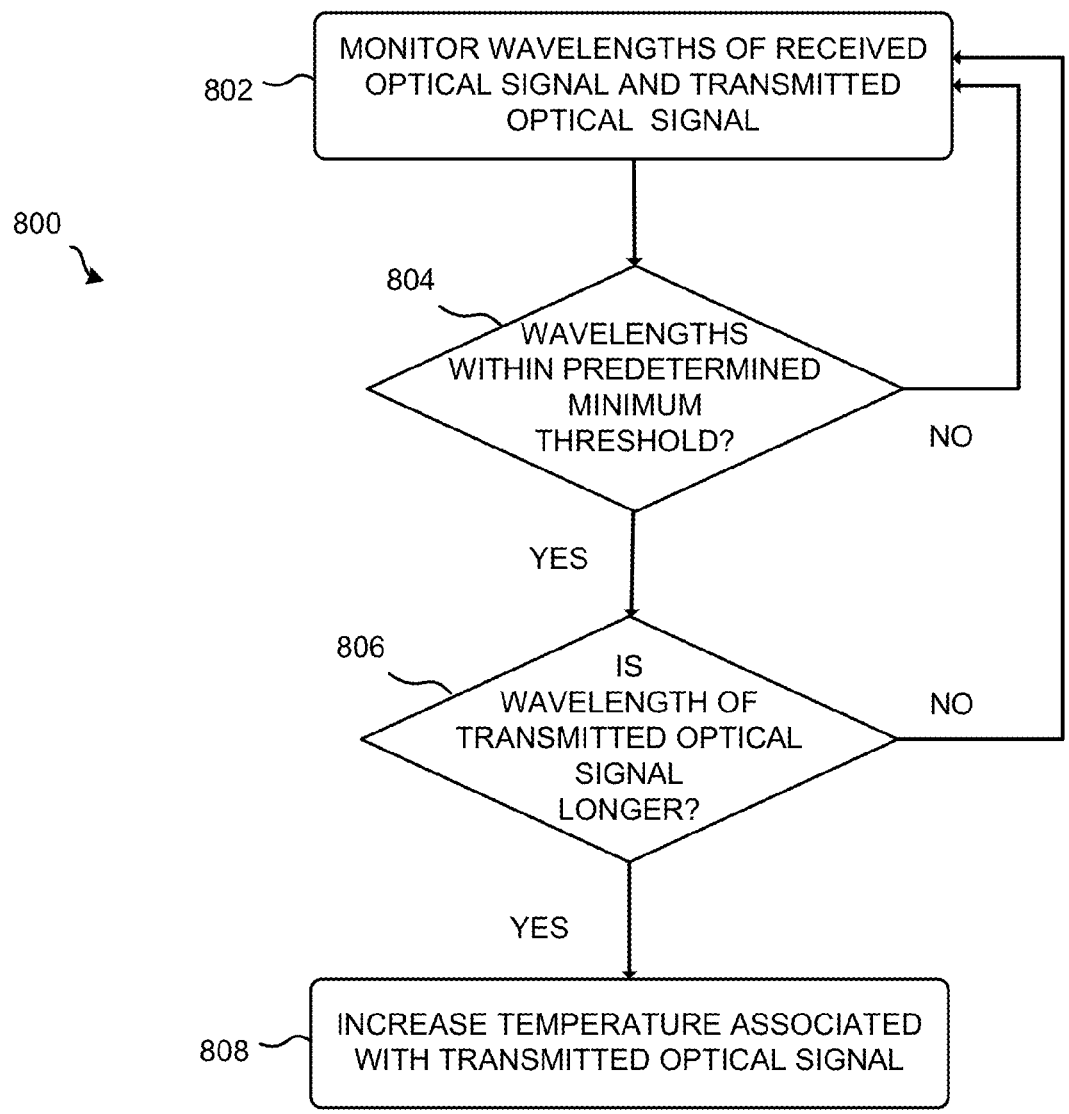
FIG. 8 is another flow chart of an exemplary process for reducing noise in a single fiber transceiver according to an implementation described herein.
Figure 9:
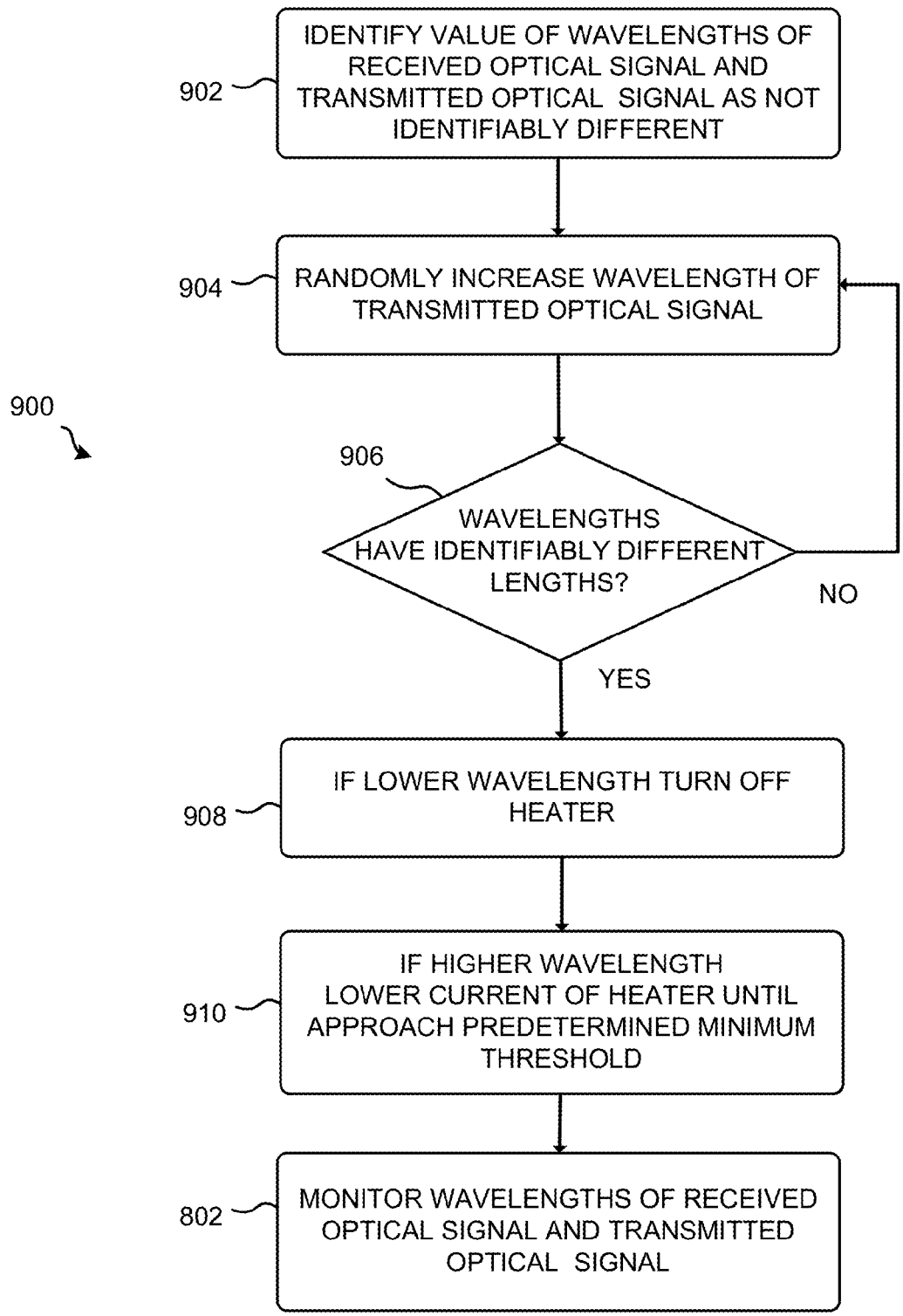
FIG. 9 is a flow chart of yet another exemplary process for reducing noise in a single fiber transceiver according to an implementation described herein.

As shown in FIG. 2, memory 202 may include a random access memory (RAM) or another type of dynamic storage device that stores information and instructions for execution by a processor, such as a processor associated with monitor and controller 204, a read only memory (ROM) or another type of static storage device that stores static information and instructions for monitor and controller 204, and/or some other type of magnetic or optical recording medium and its corresponding drive for storing information and/or instructions to monitor wavelengths and reduce coherent noise, for example as described with respect to processes 700, 800 and 900 and corresponding FIGS. 7, 8 and 9.

Monitor and controller 204 may implement a wavelength monitoring function in a single fiber transceiver, such as transceiver 104. Monitor and controller 204 may implement wavelength monitoring in association with wavelength monitor 208. Monitor and controller 204 may continuously monitor the received and transmitted optical signals to identify relative wavelengths of the received and transmitted optical signals, including whether the two wavelengths are within a predetermined minimum threshold of each other, such as described with respect to process 700 and FIG. 7. The predetermined minimum threshold may be a minimum difference between the wavelengths of the received optical signal and the transmitted optical signal at which coherent noise is reduced. The predetermined minimum threshold may be selected by an administrator or manufacturer for transceiver 104. The predetermined minimum threshold may be selected based on a level of acceptable coherent noise. For example, a comparatively larger predetermined minimum threshold may be selected in instances in which coherent noise is to be minimized without regard to other constraining factors such as bandwidth of fiber 110.

Wavelength monitor 208 may include one or more devices, such as an etalon, a dispersive device, a detector array, etc., which may identify wavelengths of optical signals received and transmitted by transceiver 104.

Monitor and controller 204 may also implement a wavelength adjusting function in transceiver 104. For example, if the two wavelengths move within the predetermined minimum threshold, due to environmental temperature change, for example, monitor and controller 204 may adjust the wavelengths of one or both optical signals using wavelength adjustor 206.

Wavelength adjustor 206 may include one or more devices, such as a temperature controller, a heater, etc., which may adjust the wavelengths of received and/or transmitted optical signals. For example, wavelength adjustor 206 may increase or decrease one or both wavelengths to prevent overlap and to establish and maintain a predetermined minimum threshold between the two wavelengths.

CDRs 212 may recover a clock signal from data included in received optical signals, using transitions in the data to adjust the rate of a local serial clock and to lock the local serial clock to the rate used by the sending transceiver 104. CDRs 212 may use a same serial clock that serialized the data to deserialize the data.

Transmission functions in transceiver 104 may be implemented using CDR 212t, driver 214, laser 216, and isolator 218.

Driver 214 is an optical driver that may regulate and control the optical signal, including applying a pulse period and/or pulse width to the optical signal.

Laser 216 may include an electrically tunable optical source configured to output or emit an optical signal having a desired wavelength. For example, laser 216 may include a distributed feedback (DFB) semiconductor laser or a vertical cavity surface emitting laser (VCSEL) that enables wavelength tuning through adjustments to a temperature of the laser device. In response to an instruction from monitor and controller 204, laser 216 may output an optical signal at a selected wavelength.

Optical isolator 218 is an optical component, such as an optical diode, which may allow the transmission of light in only one direction. Optical isolator 218 may prevent unwanted feedback into an optical oscillator, such as a laser cavity of laser 216.

Receiver functions in transceiver 104 may be implemented using CRD 212r, amplifier 220, photo detector 222.

Photo detector 222 may include a device for converting the received optical signal to a reference electrical signal. For example, photo detector 222 may include a photodiode that outputs electric signals in response to the received optical signal.

Amplifier 220 may amplify the electric signals output by photo detector 222.

Coupler 210 may couple a defined amount of the optical signals to a port enabling the signal to be used in other parts of transceiver 104 and associated communication devices 102. Coupler 210 may couple power flowing in a single direction.

Back electrical connections 224 may link to a communication device and receive power and output/input electrical signals associated with transceiver 104, such as an electrical signal that includes message data that may be input/output from transceiver 104. Additionally, back electrical connections 224 may include an electrical power source associated with laser 216.

Figure 3A:
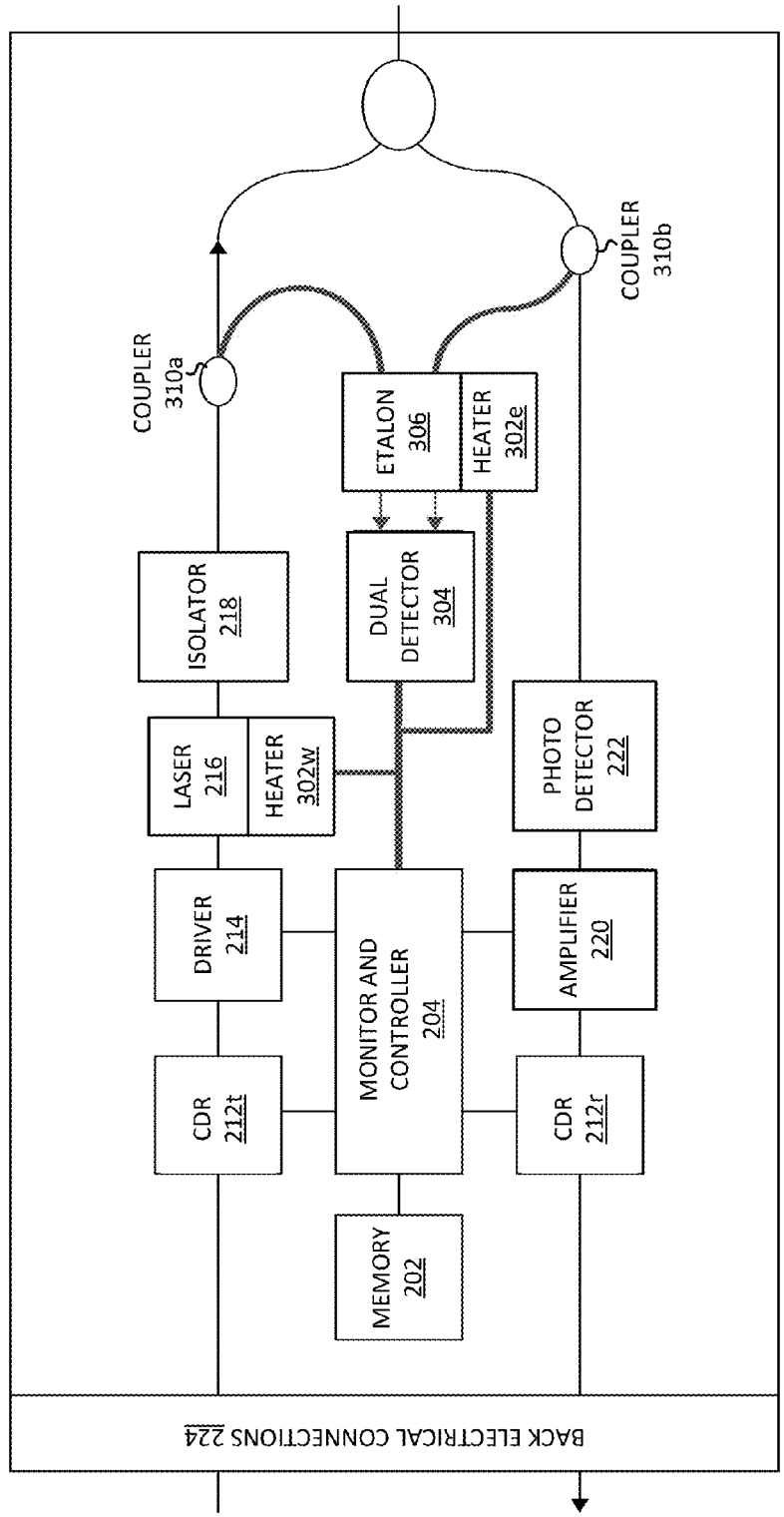
FIG. 3A is a diagram of an implementation of a single fiber transceiver including associated heating components.

FIG. 3A is a diagram illustrating an implementation of a single fiber transceiver 300 including associated heating components. Transceiver 300 may be a particular implementation of transceiver 104 in which wavelength monitor 208 is implemented using a dual detector 304 and an associated scanning etalon 306, and wavelength adjustor 206 is implemented using a heater 302w associated with laser 216 to adjust wavelength of transmitted optical signal. Transceiver 300 is described with respect to diagram 350, shown in FIG. 3B, which illustrates a relationship between case temperature and wavelength of a transmitted optical signal.

Monitor and controller 204 may implement dual detector 304 to detect and compare wavelengths of transmitted and received optical signals. As shown in FIG. 3A, transmitted and received optical signals may be coupled through etalon 306 using couplers 310a, for the transmitted optical signal, and coupler 310b for the received optical signal. Heater 302e may be used in association with etalon 306 and for passing wavelength scanning and determining the wavelengths of the received optical signal and the transmitted optical signal.

Figure 3B:
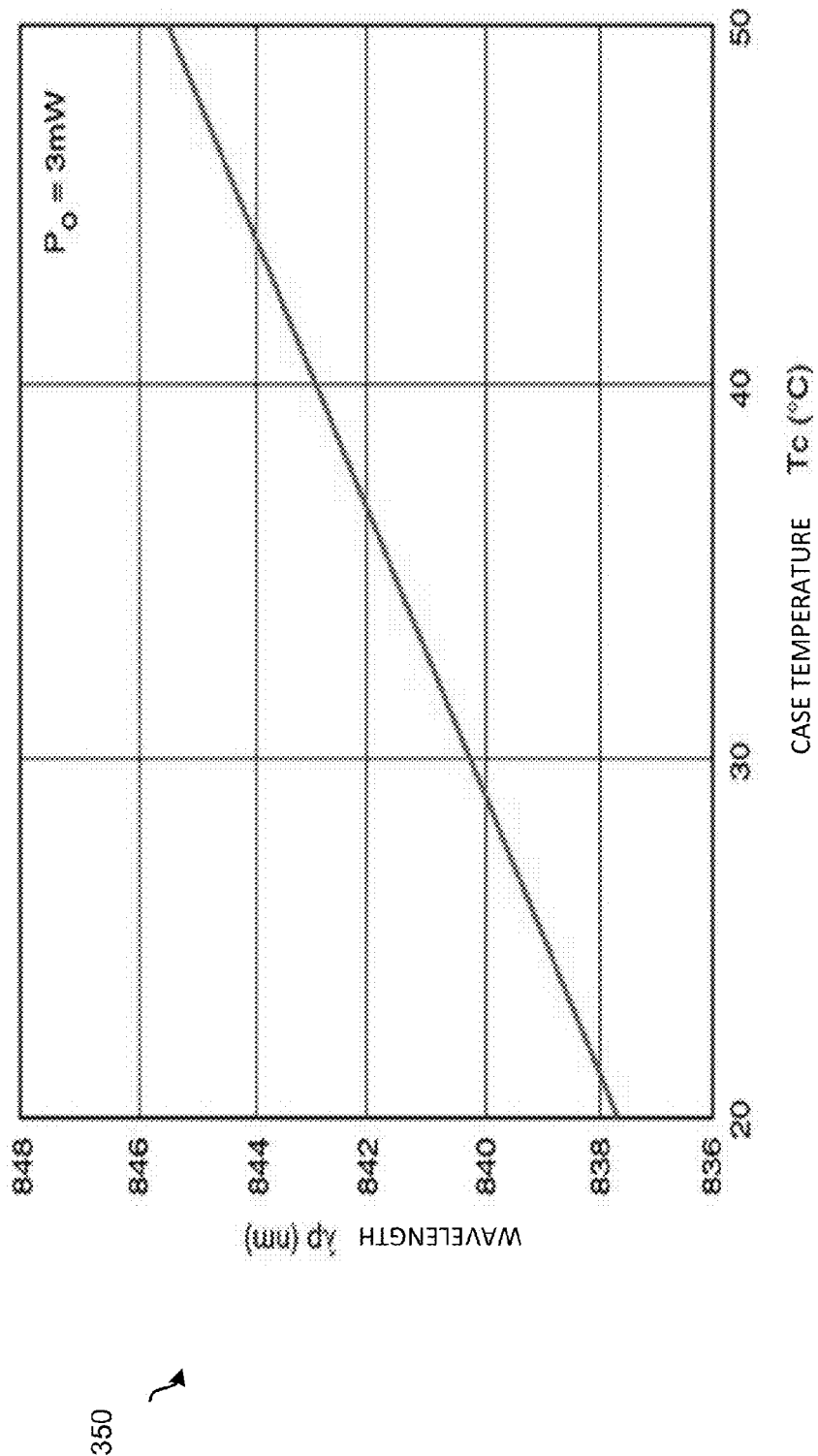
FIG. 3B is a diagram showing a relationship between wavelength and case temperature for a single fiber transceiver.

Heater 302w may be controlled by monitor and controller 204 to adjust a temperature associated with laser 216. As shown in FIG. 3B, case temperature has a linear relationship to wavelength of an optical signal for a laser, such as laser 216. Monitor and controller 204 may implement heater 302w to increase the wavelength of the transmitted optical signal. Monitor and controller 204 may also reduce an associated temperature of laser 216 by reducing heat generated by heater 302w.

FIG. 4A-4C illustrates relative wavelengths of optical signals in an optical communication system, such as communication system 100, in which wavelengths of optical signals are different at an initial instance. Each of FIGS. 4A, 4B and 4C illustrates a wavelength of light (an optical signal) from a first transceiver, transceiver 104a and a wavelength of light from a second transceiver, transceiver 104b.

As shown in FIG. 4A, the light from transceiver 104a (i.e., from Tx 106a) is initially transmitted at a lower wavelength than the light from transceiver 104b (i.e., from Tx 106b). In this instance, the difference between the wavelengths is greater than a predetermined minimum threshold to prevent degradation of the optical signals received at Rx 108a and Rx 108b based on coherent noise from Raleigh back scattering.

As shown in FIG. 4B, the two wavelengths (of the received optical signal and the transmitted optical signal, respectively) may move closer to each other. For example, the higher (or alternatively, longer) wavelength from transceiver 104b may decrease and/or the lower (or alternatively, shorter) wavelength from transceiver 104a may increase relative to the wavelength of the other optical signal. In this instance, the difference in wavelengths between the two optical signals may approach the predetermined minimum threshold.

As shown in FIG. 4C, the wavelength of the optical signal that has the longer wavelength (i.e., from transceiver 104b) may be increased, for instance using heater 302w. Heater 302w may increase the longer wavelength so that the predetermined minimum threshold is maintained between the wavelengths of the optical signals. The transceiver 104 that has the higher wavelength (in this instance, transceiver 104b) may increase the wavelength of its transmitted optical signal (e.g., by increasing temperature of an associated heater 304w) while the transceiver that has the lower wavelength may maintain or decrease the wavelength of its transmitted optical signal (e.g., by turning off an associated heater 304w or using a temperature controller).

FIGS. 5A-5E illustrate relative wavelengths of optical signals in an optical communication system, such as communication system 100, in an instance in which wavelengths of transceivers are initially the same. Each of FIGS. 5A, 5B, 5C, 5D and 5E include wavelength of light from transceiver 104a and wavelength of light from transceiver 104b.

Figure 5A:
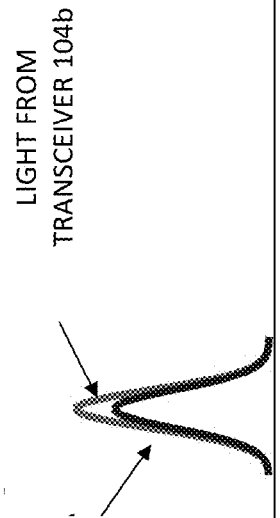

As shown in FIG. 5A, the two wavelengths (of the received optical signal and the transmitted optical signal) are initially the same, or substantially the same and wavelength monitor 208 may not be able to identify which of the wavelengths is longer. The received optical signal may be received from a sending transceiver that includes a same transmitting specification as the transceiver associated with the transmitted optical signal. In other words, the transmitter may be deployed in communication system 100 without regard to a wavelength of an initial transmitted optical signal and/or received optical signal. Identical transceivers 104 (i.e., initially operating at a same wavelength) may be deployed in communication system 100.

Figure 5B:
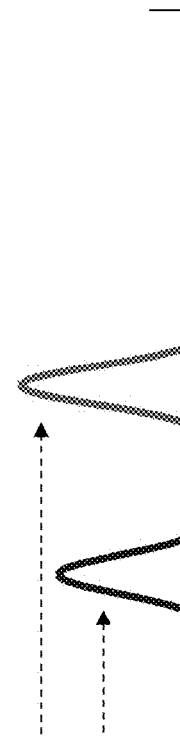

As shown in FIG. 5B, both transceivers 104 may initiate random amounts of wavelength "walk" using associated heaters, such as heater 302w. Wavelength walk occurs when the wavelength of the optical signal gradually increases. The wavelengths may increase at different rates based on random amounts of heat differentials applied to associated lasers 216.

Figure 5C:
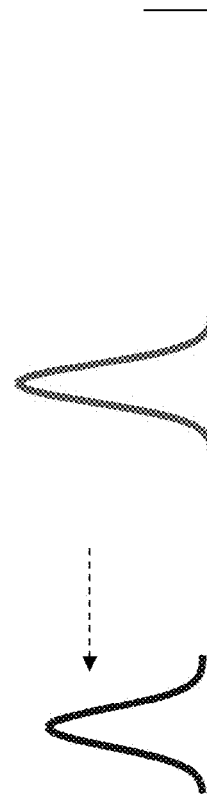

As shown in FIG. 5C, when the difference between the wavelengths becomes distinguishable, the transceiver 104 with lower wavelength may turn off an associated heater and consequently, the wavelength of the optical signal may gradually revert to a lower wavelength, in some instances the original wavelength. The transceiver 104 with the higher wavelength may hold/maintain the current wavelength.

As shown in FIG. 5D, the transceiver with the higher wavelength may gradually lower current for an associated heater and consequently the wavelength of the transmitted optical signal. When the wavelength is lowered to a wavelength that is above the predetermined minimum threshold over the lower wavelength (i.e., a safe guard from coherent noise), the process is stopped and the wavelengths are maintained at positions as shown in FIG. 5E.

Figure 6A:
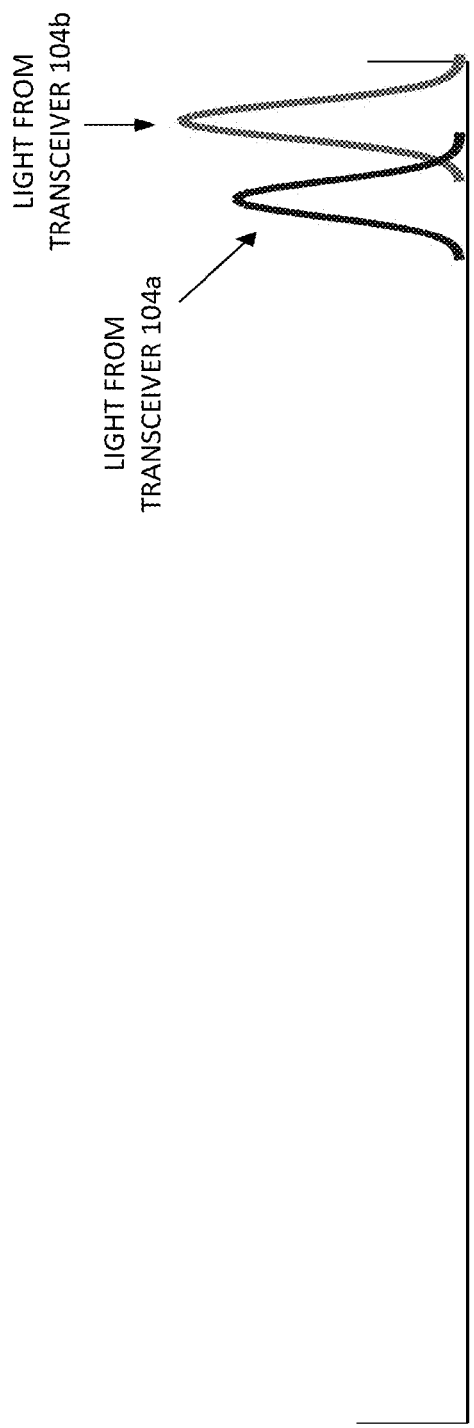
FIGS. 6A-6B illustrate yet another operating scenario based on transmitted and received wavelengths of optical signals.
Figure 6B:

FIG. 6A-6B illustrate relative wavelengths of optical signals in an optical communication system, such as communication system 100, in an instance in which wavelengths of the transceivers have reached an upper boundary of available wavelength.

As shown in FIG. 6A, when the two wavelengths move closer, but the longer wavelength is unable to increase because of the upper boundary of wavelengths in fiber 110, monitor and controller 204 may signal to provide the information included in one of the optical signals in a separate channel. Monitor and controller 204 may direct one of the information associated with the transmitted optical signal and the information associated with the wavelength of the received optical signal to be provided via an alternative channel.

Alternatively, as shown in FIG. 6B, if the transceiver includes a temperature controller (not shown), the temperature controller may drop the temperature of the laser with the lower wavelength, and move the wavelength to a lower value at which the predetermined minimum threshold may be maintained between the two wavelengths.

FIG. 7 is a flow chart of an exemplary process for reducing coherent noise in a single fiber transceiver according to implementations described herein. Process 700 is described with respect to transceiver 104 shown in FIG. 2, for illustrative purposes. In one implementation, process 700 may be performed by transceiver 104. In another implementation, some or all of process 700 may be performed by another device or group of devices, including or excluding transceiver 104.

Transceiver 104 may monitor a first wavelength (e.g., a wavelength of a transmitted optical signal) (block 702), for example using wavelength monitor 208.

At block 704, transceiver 104 may monitor a second wavelength (e.g., a wavelength of a received optical signal). For example, transceiver 104 may monitor the wavelengths of the transmitted optical signal and the received optical signal (blocks 702 and 704) using a dual detector and an etalon, such as described with respect to FIG. 3A and dual detector 304 and etalon 306.

At block 706, transceiver 104 may determine whether a first wavelength (e.g., for the transmitted signal) is identifiably different than the second wavelength (for the received signal).

At block 708, in response to a determination that the first wavelength is identifiably different than the second wavelength, transceiver 104 may maintain separation between the wavelengths, for example using a process such as described below with respect to FIG. 8 and process 800. Transceiver 104 may maintain a predetermined minimum threshold between the two wavelengths.

At block 710, in response to a determination that the first wavelength is not identifiably different than the second wavelength, transceiver 104 may induce a separation of the wavelengths, for example using a process such as described below with respect to FIG. 9 and process 900.

After the wavelengths have been separated (block 710, e.g., process 900 shown in FIG. 9), transceiver 104 may maintain separation between the wavelengths, for example using a process such as described below with respect to FIG. 8 and process 800 (block 708).

FIG. 8 is a flow chart of an exemplary process for reducing coherent noise in a single fiber transceiver according to implementations described herein. Process 800 is described with respect to transceiver 300 shown in FIG. 3A, for illustrative purposes. In one implementation, process 800 may be performed by transceiver 300. In another implementation, some or all of process 800 may be performed by another device or group of devices, including or excluding transceiver 300.

As shown in FIG. 8, transceiver 300 may monitor wavelengths of a received optical signal and a transmitted optical signal (block 802). At block 804, transceiver 300 may determine whether the wavelengths are within the predetermined minimum threshold. For example, transceiver 300 may measure the wavelengths of the received optical signal and the transmitted optical signal. Transceiver 300 may subtract the value of the wavelength of the received optical signal from the transmitted optical signal and determine whether the resulting value is within a range defined by the predetermined minimum threshold.

If the wavelengths are not within the predetermined minimum threshold (block 804, no), transceiver 300 may continue monitoring the wavelengths of the optical signals (block 802). However, if the wavelengths are within the predetermined minimum threshold (block 804, yes), transceiver 300 may determine whether the wavelength of the transmitted optical signal is longer than the wavelength of the received optical signal (block 806).

If the wavelength of the transmitted optical signal is shorter than the wavelength of the received optical signal (block 806, no), transceiver 300 may continue monitoring the wavelengths of the optical signals (block 802). However, if the wavelength of the transmitted optical signal is longer than the wavelength of the received optical signal (block 806, yes), transceiver 300 may increase the temperature associated with laser 216 and consequently the wavelength of the transmitted optical signal until the difference in the wavelengths becomes greater than the predetermined minimum threshold.

FIG. 9 is a flow chart of an exemplary process for reducing coherent noise in a single fiber transceiver according to implementations described herein. Process 900 is described with respect to transceiver 300 shown in FIG. 3A, for illustrative purposes. In one implementation, process 900 may be performed by transceiver 300. In another implementation, some or all of process 900 may be performed by another device or group of devices, including or excluding transceiver 300.

At block 902, transceiver 300 may identify the wavelengths of the received optical signal and the transmitted optical signal as being not identifiably different.

Transceiver 300 (e.g. transceiver A) may randomly increase the wavelength of the transmitted optical signal (block 904). Similarly, the receiving transceiver 300 (e.g. transceiver B) may randomly increase the wavelength of the optical signal that transceiver B transmits (i.e., the received optical signal for transceiver A). The random increases in wavelengths for both transceiver A and transceiver B are substantially probable to be unequal, consequently initiating different rates of wavelength walk.

Transceiver 300 may determine whether the wavelengths have identifiably different lengths after the random increase in wavelength (block 906). If transceiver 300 determines that the wavelengths do not have identifiably different lengths (block 906, no), transceiver 300 may again randomly increase the wavelength of the transmitted optical signal (block 904). This cycle (block 904 to 906) may continue until the wavelengths are identifiably different.

If transceiver 300 determines that the wavelengths have identifiably different lengths (block 906, yes), transceiver 300 may determine whether the transmitted optical signal has a lower or a higher wavelength than the received optical signal.

If the transmitted optical signal has a lower wavelength (than the received optical signal), transceiver 300 may turn off the associated heater $302w$ (block 908). The wavelength of the transmitted optical signal may then gradually revert to the start or baseline wavelength (i.e., the wavelength measured at block 902) as heat generated by the heater $302w$ is dispersed.

If the transmitted optical signal has a higher wavelength, transceiver 300 may lower the current of the associated heater $302w$ until the difference between the wavelengths of the transmitted optical signal and the received optical signal approaches the predetermined minimum threshold (block 910).

Transceiver 300 may manage the wavelengths to maintain the predetermined minimum threshold between the wavelengths, for example as described above with respect to FIG. 8 and process 800. Transceiver 300 may continue to monitor the wavelengths of received optical signal and transmitted optical signal as described at block 802, and may perform subsequent activities as described in blocks 804 to 808 of process 800.

Note that processes 700, 800 and/or 900 may be implemented at each transceiver 104 in both ends of communications system 100 to reduce coherent noise in communication system 100 by establishing and maintaining a predetermined minimum threshold between wavelengths of the transceivers 104.

Systems and/or methods described herein may be applied to reduce coherent noise in single fiber transceivers. Coherent noise may be reduced by providing a predetermined minimum threshold between the wavelengths of a received optical signal and transmitted optical signal, thereby significantly reducing the probability of Raleigh back scattering from one optical signal affecting the other optical signal.

In the preceding specification, various preferred embodiments have been described with reference to the accompanying drawings. It will, however, be evident that various modifications and changes may be made thereto, and additional embodiments may be implemented, without departing from the broader scope of the invention as set forth in the claims that follow. The specification and drawings are accordingly to be regarded in an illustrative rather than restrictive sense. For example, while series of blocks have been described with respect to FIGS. 7, 8 and 9, the order of the blocks may be modified in other implementations. Further, non-dependent blocks may be performed in parallel.

It will be apparent that different aspects of the description provided above may be implemented in many different forms of software, firmware, and hardware in the implementations illustrated in the figures. The actual software code or specialized control hardware used to implement these aspects is not limiting of the invention. Thus, the operation and behavior of these aspects were described without reference to the specific software code—it being understood that software and control hardware can be designed to implement these aspects based on the description herein.

Further, certain portions of the invention may be implemented as a "component" or "system" that performs one or more functions. These components/systems may include hardware, such as a processor, an ASIC, or a FPGA, or a combination of hardware and software.

No element, act, or instruction used in the present application should be construed as critical or essential to the invention unless explicitly described as such. Also, as used herein, the article "a" and "one of" is intended to include one or more items. Further, the phrase "based on" is intended to mean "based, at least in part, on" unless explicitly stated otherwise.

What is claimed is:

1. A computing device-implemented method, comprising:
    monitoring, by a transceiver, a first wavelength corresponding to a transmitted optical signal;
    monitoring, also by the transceiver, a second wavelength corresponding to a received optical signal;
    determining whether the first wavelength is identifiably different than the second wavelength;
    maintaining a spectral separation between the first and second wavelengths if the first and second wavelengths are identifiably different;
    spectrally separating the first and second wavelengths if the first and second wavelengths are not identifiably different;
    maintaining the spectral separation between the first and second wavelengths following separation of the first and second wavelengths:
    determining that the first wavelength and the second wavelength are within a predetermined minimum threshold of an upper boundary of wavelengths for the transceiver; and
    directing one of information associated with the first wavelength and an information associated with the second wavelength to be provided via an alternative channel.

2. The computing device-implemented method of claim 1, wherein maintaining the spectral separation between the first and second wavelengths further comprises:
    determining whether the first wavelength and the second wavelength are within a predetermined minimum threshold;
    determining whether the first wavelength is longer than the second wavelength if the first wavelength and the second wavelength of the received optical signal are not within the predetermined minimum threshold; and
    increasing a temperature associated with the transmitted optical signal if the first wavelength is longer than the second wavelength to cause an increase in the first wavelength.

3. The computing device-implemented method of claim 1, wherein spectrally separating the first and second wavelengths further comprises:
    activating a heater to randomly increase the first wavelength;
    determining whether the first wavelength and the second wavelength have identifiably different lengths;
    turning off the heater if the first wavelength is lower than the second wavelength; and
    lowering a current of the heater until the first wavelength approaches a predetermined minimum threshold if the first wavelength is higher than the second wavelength.

4. The computing device-implemented method of claim 1, further comprising:
    identifying the first wavelength and the second wavelength as both within a predetermined minimum threshold of an upper boundary of wavelengths of the transceiver; and
    lowering the first wavelength to provide a predetermined minimum threshold between the first wavelength and the second wavelength.

5. The computing device-implemented method of claim 4, wherein lowering the first wavelength to provide a predetermined minimum threshold comprises lowering the wavelength using a temperature controller.

6. The computing device-implemented method of claim 1, wherein monitoring the first wavelength and the second wavelength further comprises:
    monitoring the first wavelength and the second wavelength using an etalon and a dual detector.

7. The computing device-implemented method of claim 1, wherein the received optical signal is received from a sending transceiver that includes a same transmitting specification as the transceiver associated with the transmitted optical signal.

8. The computing device-implemented method of claim 1, further comprising:
    implementing the method using a high data rate transceiver.that includes a date rate of at least 10 gigabytes per second.

9. The computing device-implemented method of claim 1, wherein the predetermined minimum threshold is determined based on a level of acceptable coherent noise.

10. A transceiver, comprising:
    a memory to store a plurality of instructions; and
    a processor configured to execute instructions in the memory to:
        monitor a first wavelength corresponding to a transmitted optical signal;
        monitor a second wavelength corresponding to a received optical signal;
        determine whether the first wavelength is identifiably different than the second wavelength;
        maintain a spectral separation between the first and second wavelengths if the first and second wavelengths are identifiably different;
        spectrally separate the first and second wavelengths if the first and second wavelengths are not identifiably different; and
        maintain the spectral separation between the first and second wavelengths following the spectral separation of the first and second wavelengths, wherein when maintaining the spectral separation, the processor is to
            determine whether the first wavelength and the second wavelength are within a predetermined minimum threshold;
            determine whether the first wavelength is longer than the second wavelength if the first wavelength and the second wavelength are not within the predetermined minimum threshold; and
            increase temperature associated with the first wavelength if the first wavelength is longer than the second wavelength.

11. The transceiver of claim 10, wherein the transceiver is a high data rate transceiver that includes a date rate of at least 10 gigabytes per second.

12. The transceiver of claim 10, wherein the transceiver is a small form factor transceiver.

13. The transceiver of claim 10, wherein, when spectrally separating the wavelengths, the processor is further configured to:

activate a heater to randomly increase the first wavelength;

determine whether the first wavelength and the second wavelength have identifiably different lengths;

turn off the heater if the first wavelength is lower than the second wavelength; and lower a current of the heater until the first wavelength approaches a predetermined minimum threshold if the first wavelength is higher than the second wavelength.

14. The transceiver of claim 10, wherein the processor is further configured to:

determine that the first wavelength and the second wavelength are within a predetermined minimum threshold of an upper boundary of wavelengths; and direct one of an information associated with the first wavelength and an information associated with the second wavelength to be provided via an alternative channel.

15. The transceiver of claim 10, wherein the processor is further configured to:

identify the first wavelength and the second wavelength as both within a predetermined minimum threshold of an upper boundary of wavelengths; and lower the first wavelength, using a temperature controller, to provide a predetermined minimum threshold between the first wavelength and the second wavelength.

16. The device of claim 10, wherein, when monitoring the first wavelength and the second wavelength, the processor is further configured to:

monitor the first wavelength and the second wavelength using one or more of an etalon, adispersive device, or a detector array.

17. A non-transitory computer-readable medium including instructions, when executed by a processor, the instructions including one more instructions, when executed by the processor, for causing the processor to:

monitor, by a transceiver, a first wavelength corresponding to a transmitted optical signal;

monitor, also by the transceiver, a second wavelength corresponding to a received optical signal;

determine whether the first wavelength and the second wavelength are within a predetermined minimum threshold;

determine whether the first wavelength is longer than the second wavelength if the first wavelength and the second wavelength are not within the predetermined minimum threshold;

increase the first wavelength if the first wavelength is longer than the second wavelength; and maintain a spectral separation between the frist and second wavelengths if the first wavelength and the second wavelength are not within the predetermined minimum thresholds, wherein, when maintaining the spectral separation, the processor is to:

determine whether the first wavelength is longer than the second wavelength if the first wavelength and the second wavelength of the received optical signal are not within the predetermined minimum threshold, and increase a temperature associated with the transmitted optical signal if the first wavelength is longer than the second wavelength to cause an increase in the first wavelength.

18. The non-transitory computer-readable medium of claim 17, wherein the received optical signal is received from a sending transceiver including at least one same initial transmitting parameter as the transceiver associated with the transmitted optical signal.

19. The non-transitory computer-readable medium of claim 17 wherein the received optical signal is received from a sending transceiver that includes a same transmitting specification as the transceiver associated with the transmitted optical signal.

20. The non-transitory computer-readable medium of claim 17 wherein the predetermined minimum threshold is determined based on level of acceptable coherent noise.

* * * * *